United States Patent [19]

Tsou

[11] Patent Number: 6,071,406
[45] Date of Patent: Jun. 6, 2000

[54] HYDROPHILIC POLYMERIC PHASE INVERSION MEMBRANE

[75] Inventor: Dean T. Tsou, Solon, Ohio

[73] Assignee: Whatman, Inc., Rockland, Mass.

[21] Appl. No.: 09/308,020

[22] PCT Filed: Nov. 10, 1997

[86] PCT No.: PCT/US97/20285

§ 371 Date: Aug. 20, 1999

§ 102(e) Date: Aug. 20, 1999

[87] PCT Pub. No.: WO98/20960

PCT Pub. Date: May 22, 1998

Related U.S. Application Data

[60] Provisional application No. 60/030,142, Nov. 12, 1996.

[51] Int. Cl.[7] .................................................... B01D 39/16
[52] U.S. Cl. ............................... 210/500.41; 210/500.27; 210/500.36; 210/500.43; 264/41; 264/48; 264/49
[58] Field of Search ..................... 210/500.27, 500.36, 210/500.41, 500.43, 500.38; 264/41, 48, 49

[56] References Cited

U.S. PATENT DOCUMENTS

| | | | |
|---|---|---|---|
| 4,156,067 | 5/1979 | Gould | 210/500.41 |
| 4,432,875 | 2/1984 | Wrasidlo et al. | 210/500.41 |
| 5,240,614 | 8/1993 | Ofsthun | 210/500.41 |
| 5,376,274 | 12/1994 | Muller et al. | 210/500.41 |

*Primary Examiner*—Ana Fortuna
*Attorney, Agent, or Firm*—Kohn & Associates

[57] ABSTRACT

A process for rendering hydrophilic a separation membrane having a hydrophobic matrix polymer comprises doping the membrane solvent system with a cyclic ester additive which is compatible with the matrix polymer and adding a wetting agnet additive, such that the resulting membrane is instantaneously wetted. The invention further relates to the membrne formed in accord with this process.

11 Claims, No Drawings

HYDROPHILIC POLYMERIC PHASE INVERSION MEMBRANE

This application claims the benefit of provisional application Ser. No. 60/030,142, filed Nov. 12, 1996.

BACKGROUND OF THE INVENTION

The invention relates to a method of rendering a microporous membrane hydrophilic. More specifically, the invention relates to the addition of a specified agent to the solvent system used in casting such membranes to enhance the permanent hydrophilicity of the membrane. The invention further relates to the membrane produced using the subject casting composition, including the solvent system additive.

Many synthetic polymeric membranes are made by known phase inversion processing. Generally, the polymeric matrix material used for membranes prepared for micro- and ultra-filtration is hydrophobic in nature, thus making the filtration of aqueous systems difficult. To render the hydrophobic membranes hydrophilic, and thereby usable for the filtration of aqueous solutions, a wetting agent can be added to the polymeric system used to cast the membrane. The wetting agent, which is a surface active agent, can be applied to the membrane matrix in a post-production treatment step. Wetting agents added in this manner, however, tend to suffer from extensive leaching problems, introducing foreign materials, such as wetting agents, into the filtrate. The leaching problem can be addressed by using a polymeric wetting agent, crosslinked during the post-treatment step onto the membrane matrix (e.g., U.S. Pat. No. 5,376,274). The addition of a post-treatment step, however, complicates the membrane production process.

The leaching problem encountered when using post-treated membranes has also been addressed by a process wherein the wetting agent is trapped within and on the membrane surface. This is generally accomplished by incorporation of the wetting agent into the original membrane casting formulation, resulting in a portion of the agent being trapped at the membrane surface, as is disclosed in U.S. Pat. No. 4,900,449. Some factors which affect the amount of agent which is trapped at the membrane surface include the speed with which the precipitation is accomplished, and the extent of blending of the various components. In the '449 patent, hydrophilicity is accomplished by using hydrophilic additives such as polyethylene glycol and polyvinylpyrrolidone. This membrane system nonetheless suffers from a certain amount of leaching of the additive from the membrane during the washing step, most likely due to incompatibility of the hydrophilic polyethylene glycol and polyvinylpyrrolidone additives with the hydrophobic polyethersulfone membrane matrix polymer. This membrane is thus left with an uncontrolled or inconsistent wetting agent content, and further exhibits a lack of uniformity across the membrane surface.

Another attempt at solving the leaching problem encountered with hydrophobic membranes rendered hydrophilic by the addition of a wetting agent involved the use of a block copolymer as a matrix additive, the copolymer comprising a combination of hydrophobic and hydrophilic portions. The hydrophobic portion of the copolymer additive, being more compatible with the hydrophobic matrix polymer, tends to tangle with and thus become anchored to the membrane matrix polymer, leaving the hydrophilic portion of the copolymer at the membrane surface. The interaction between the main hydrophobic matrix membrane, the block copolymer additive and the solvent system used for the formulation is a complicated one. Variations in the type and amount of the various components of the system as a whole may cause more or less entanglement of the block copolymer with the membrane matrix and thereby affect the hydrophilicity of the membrane. While the addition of a block copolymer wetting agent improves over other prior art methods noted above, it nonetheless suffers, even slightly, from problems related to the amount of agent actually retained at the membrane surface.

It has remained for the current invention to provide a means by which a block copolymer, added to the matrix polymer material to render the polymeric membrane cast therefrom hydrophilic for use in aqueous separation processes, can be substantially permanently anchored at the membrane surface. This avoids much of the leaching problem during use, as well as avoiding problems related to variations in membrane surface hydrophilicity.

SUMMARY OF THE INVENTION

The invention relates to a process for rendering hydrophilic a separation membrane having a hydrophobic matrix polymer. The process comprises doping the membrane solvent system with a cyclic ester additive which is compatible with the matrix polymer and adding a wetting agent additive, such that the resulting membrane is instantaneously wetting. The invention further relates to the membrane formed in accord with this process.

DETAILED DESCRIPTION OF THE INVENTION

The invention relates to the addition of a hydrophilicity enhancing agent to the solvent system of a composition used to cast microporous membranes. In a membrane casting solution comprising a matrix polymer and a copolymer wetting agent, the invention provides for the addition of an agent to the solvent system of the casting composition which substantially permanently anchors a copolymer wetting agent additive, used to render the membrane hydrophilic, to the hydrophobic matrix polymer. Specifically, the invention relates to the addition of γ-butyrolactone to the solvent system of the membrane to promote the entanglement of the block copolymer with the membrane matrix and impart hydrophilicity to the resulting phase inversion membrane. Further, the membrane thus prepared is instantaneously wetting.

There are several processes for the preparation of porous polymeric structures. Most common processes are based on phase separation of a polymer solution. In such processes, the composition or temperature of a polymer solution is changed in such a way that it becomes thermodynamically unstable and separates into two phases. One of the phases, containing most of the solvent components, is then removed and the other becomes the porous structure. The types of phase separation processes are usually classified into three categories: 1) vapor-induced phase separation (VIPS), also called "dry casting" or "air casting"; 2) liquid-induced phase separation (LIPS), mostly referred to as "immersion casting" or "wet casting"; and 3) thermally induced phase separation (TIPS), frequently called "melt casting". While any of the foregoing phase inversion promoting processes may be used, the membrane herein is preferably prepared by vapor phase inversion processing. This method operates by the introduction of moisture to the system and the subsequent removal of the solvent. Further, more complicated formulations can be handled when using this type of process.

The addition of an appropriate cyclic ester to the solvent system greatly enhances the wettability of the membrane. Suitability of cyclic ester compounds for use in the invention is determined by the compatibility of the cyclic ester compound with the remaining components of the formulation at given levels of composition. In the preferred embodiment of the invention, γ-butyrolactone is employed as the ester additive for a membrane system which further comprises a polyethersulfone (PES) matrix polymer in combination with an ethylene oxide-propylene oxide (EO-PO) block copolymer wetting agent. Hereafter, the invention will be discussed with reference to this membrane system and the γ-butyrolactone additive. It is to be understood, however, that other systems may include, and in fact achieve better performance from, the use of other more chemically compatible cyclic ester compounds.

The lactone additives, particularly the γ-butyrolactone, function to place or position the hydrophilic portion of the block copolymer wetting agent portion of the membrane system at the polymer-solvent interface during the phase inversion process described above. This positioning promotes polymer chain entanglement, thus resulting in enhanced hydrophilicity on a substantially permanent basis. Given the permanent aspect of the entanglement, inconsequential leaching of wetting agent occurs during filtration, which results in considerable improvement in membrane performance over prior art membranes used for similar separation processes.

The subject solvent additive is suitable for use in most, if not all, phase inversion membranes. "Separation membrane", as used herein, is meant to include any type of aqueous separation membrane, including microfiltration membranes, ultrafiltration membranes, nanofiltration membranes, and others. Further, the separation membranes may be in any form, such as flat sheets, hollow fibers, tubular membranes, supported and unsupported membranes, and others. The phrase "membrane casting solution" as used herein refers to the solution from which a membrane is produced and is not intended to limit the subject invention to membranes formed only by casting, but also includes membranes formed by any other conventional or known method, such as spinning.

For many of the target separations, strength and chemical resistance of the membrane are important. However, most membranes which demonstrate sufficient strength and chemical resistance are hydrophobic in nature. A hydrophobic membrane is defined as that membrane which will absorb less than about 0.5% of its weight in water under common hydrophilicity test conditions. A common measure of hydrophobicity of polymers is water absorption by the bulk polymer within 24 hours or at equilibrium as set out in ASTM D570 (standard method to measure water absorption by polymers). There is, however, no commonly agreed definition of hydrophobic and hydrophilic polymers. For purposes of this invention, a hydrophobic polymer is one absorbing less than 0.5% of its weight of water within 24 hours, and 4% or less at equilibrium. The surface of a solid piece of such a polymer will typically not wet, and a water drop placed on such an inclined surface will roll off without tailing.

Literature data on the water absorption of a number of polymers is given in the following table.

TABLE I

Water Absorption of Polymers
(Source: Modern Plastics Encyclopedia 1985)

| Polymer | 24 hour | Saturation |
|---|---|---|
| PTFE | 0.01% | |
| Polyacrylonitrile | 0.30% | |
| Polyetherimide | 0.25% | 1.25% |
| Thermoplastic polyimide | 0.24% | |
| Polyamide-imide | 0.28% | 4.00% |
| Polysulfone | 0.30% | 0.70% |
| Polyethersulfone | 0.40% | 2.50% |
| Aromatic polyamide | 0.40% | 4.20% |
| Nylon 66 | 1.10% | 8.50% |
| Cellulose acetate | 2.70% | |

By the above definition, polyetherimide, polysulfone and polyethersulfone are hydrophobic, while nylon 66, aromatic polyamide and cellulose acetate are hydrophilic. In addition to those polymers shown above to be hydrophobic, other suitable bulk matrix polymers which are also hydrophobic by the foregoing standard include polyvinyldifluoride (PVDF), polyimide, and nitrocellulose. The preferred polymer is polyethersulfone.

The block copolymer component of the membrane casting solution may be any block copolymer in which the hydrophilic component of the polymer is comprised of ethylene oxide units and the hydrophobic portion of the polymer is comprised of propylene oxide units, butylene oxide units or other alkyl group-containing units. The block copolymer may be of a wide range of molecular weights and the proportion of hydrophobic to hydrophilic units may vary as well.

The additive to be used in the solvent system of the membrane must function to position the hydrophilic portion of the block copolymer at the matrix-solvent interface during the phase inversion process. It is this function of the solvent additive which ensures and promotes entanglement of the hydrophobic units of the block copolymer with the matrix polymer chains, leaving the hydrophilic units of the copolymer on the membrane surface. Further, use of a solvent additive of the type recited herein results in the improved wetting of the membrane. Without the solvent additive, and using the copolymer as the only matrix additive, the matrix polymer-block copolymer blend will slowly wet. Use of the solvent additive, however, renders the membrane more hydrophilic and greatly enhances the wettability of the membrane. While γ-butyrolactone is the solvent additive of the preferred embodiment of the invention, it is also possible to use other cyclic esters which behave similarly in the presence of a given matrix polymer-block copolymer blend.

As another embodiment of the invention, it is possible to use the additive described herein as the sole solvent and not as part of a solvent system.

In this instance, it is important to limit the amount of γ-butyrolactone used to avoid formation of a gel which cannot be readily cast. Where, however, a solvent system is used, the system may comprise one or more compatible solvents. Solvents which may be used are common solvents such as N,N-dimethylformamide (DMF), N,N-dimethyl acetamide (DMAc), dimethyl sulfoxide (DMSO), N-methyl pyrrolidone (NMP), tetramethylurea, triethylphosphate, halogenated hydrocarbons, ketones, and esters. These and other similar solvents may be used in the invention, either alone or in combination with each other in proportions appropriate for the matrix employed and the filtration to be accomplished.

The following examples are provided merely as a means of better acquainting the reader/user with the invention in its preferred embodiment. The full breadth of the invention is not intended to be limited by the examples, but rather only the scope and breadth of the broadest claim appended hereto.

EXAMPLES 1–3

The membrane system for Examples 1–3 comprised polyethersulfone (BASF Ultrason E 6020) resin as the bulk polymer, polyethylene glycol 300 poreformer, a block copolymer having a propylene oxide-ethylene oxide-propylene oxide structure (PO-EO-PO) (Pluronic 10R5), NMP solvent, and Examples 2 and 3 further included γ-butyrolactone as the hydrophilicity enhancing cyclic ester additive. These components were mixed in the ratios listed in Table II. The block copolymer also functions as a poreformer. The mixture was stirred to homogeneity and cast at 10 mil on a glass plate. The cast membranes were then subjected to 80–85% relative humidity ambient air for 20 minutes. During this time the films became opaque. The films were then immersed in water to complete coagulation, and were washed thoroughly to leach out excess solvent and poreformer. The resultant films were then dried at ambient temperature overnight.

TABLE II

| Example | PES | PEG-300 | Pluronic 10R5 | NMP | γButyrolactone | Total |
|---|---|---|---|---|---|---|
| 1 | 12.0% | 32.5% | 36.1% | 19.4% | | 100% |
| 2 | 12.0% | 32.5% | 36.1% | | 19.4% | 100% |
| 3 | 11.6% | 33.9% | 37.0% | 5.0% | 12.5% | 100% |

| Example | bubble point (psi) | Water Flow Rate (cc/cm$^2$/min/10 psi) | Wetting Time (sec.) |
|---|---|---|---|
| 1 | 50 | 11.4 | 18 |
| 2 | 54 | 9.3 | instantaneous |
| 3 | 48 | 15.9 | instantaneous |

The data in the foregoing table demonstrates the usefulness of the solvent additive in promoting hydrophilicity of the membrane. Specifically, the wetting time for various membranes, one prepared in the conventional manner without the solvent additive which is the subject hereof, and two membranes wherein the solvent additive has been used. Examples 2 and 3 wetted instantaneously, while Example 1 without the additive took a longer time to wet.

EXAMPLES 4–11

The following Examples 4–11 are provided to demonstrate the affect of various solvents on the current invention. As shown in Table III, with all other factors remaining constant, membranes were prepared in accord with the method set forth in Examples 1–3 and only the solvent was changed.

TABLE II

| Example | PES | PEG-300 | Pluronic 10R5 | Solvent | γButyrolactone | Total |
|---|---|---|---|---|---|---|
| 4 | 12.0% | 28.9% | 37.0% | DMAc 22.1% | | 100% |
| 5 | 12.0% | 28.9% | 37.0% | DMAc 7.1% | 15.0% | 100% |
| 6 | 12.0% | 28.9% | 37.0% | DMF 22.1% | | 100% |
| 7 | 12.0% | 28.9% | 37.0% | DMF 7.1% | 15.0% | 100% |
| 8 | 12.0% | 28.9% | 37.0% | DMSO 22.1% | | 100% |
| 9 | 12.0% | 28.9% | 37.0% | DMSO 7.1% | 15.0% | 100% |
| 10 | 12.0% | 28.9% | 37.0% | TMU 22.1% | | 100% |
| 11 | 12.0% | 28.9% | 37.0% | TMU 7.1% | 15.0% | 100% |

| Example | bubble point (psi) | Water Flow Rate (cc/cm$^2$/min/10 psi) | Wetting Time (sec.) |
|---|---|---|---|
| 4 | 42 | 24.4 | 38 |
| 5 | 50 | 17.8 | instantaneous |
| 6 | 49 | 19.5 | 12 |
| 7 | 50 | 15.4 | instantaneous |
| 8 | 45 | 10.1 | hydrophobic |
| 9 | 60 | 12.7 | 3.2 |
| 10 | 48 | 16.1 | 2.5 |
| 11 | 56 | 14.3 | instantaneous |

The foregoing shows clearly the affect on wettability of including the γ-butyrolactone additive, as well as the affect of using different solvents.

EXAMPLES 12–16

The affect of changing the amount of cyclic ester additive was also analyzed. As will be noted, an increase in the amount of γ-butyrolactone used required a corresponding decrease in the amount of NMW solvent. The membranes were prepared in keeping with the method set forth above in Examples 1–3, with the only change being the amount of cyclic ester additive.

TABLE IV

| Example | PES | PEG-300 | Pluronic 10R5 | NMP | γButyrolactone | Total |
|---|---|---|---|---|---|---|
| 12 | 12.0% | 28.9% | 37.0% | 22.1% | 0.0% | 100% |
| 13 | 12.0% | 28.9% | 37.0% | 18.4% | 3.8% | 100% |
| 14 | 12.0% | 28.9% | 37.0% | 14.6% | 7.5% | 100% |
| 15 | 12.0% | 28.9% | 37.0% | 10.9% | 11.3% | 100% |
| 16 | 12.0% | 28.9% | 37.0% | 7.1% | 15.0% | 100% |

| Example | bubble point (psi) | Water Flow Rate (cc/cm$^2$/min/10 psi) | Wetting Time (sec.) |
|---|---|---|---|
| 12 | 45 | 18.0 | 3.3 |
| 13 | 48 | 15.4 | 3.7 |
| 14 | 51 | 14.0 | 1.1 |
| 15 | 53 | 13.2 | instantaneous |
| 16 | 45 | 18.8 | instantaneous |

The foregoing shows that in the given PES/pluronic membrane system, the γ-butyrolactone must be added in an amount that is greater than at least 7.5% of the system in order to obtain an instantaneous wetting membrane.

EXAMPLES 17–21

In the following Examples 17–21, the membranes tested were prepared in accord with the processing used thus far, the only change being the use of polysulfone (PS) rather than polyether sulfone (PES) bulk resin polymer. The data presented illustrates that even in the presence of the cyclic ester additive at levels well above that shown to be suitable for PES, the PS/γ-butyrolactone system remains hydrophobic. It is further noted that the use of a different solvent system may affect the hydrophilicity of PS membrane systems of the type shown herein, Table V sets forth the hydrophilicity test results for these membranes

TABLE V

| Example | PS | PEG-300 | Pluronic 10R5 | NMP | γButyrolactone | Total |
|---|---|---|---|---|---|---|
| 17 | 10.7% | 25.7% | 32.9% | 30.8% | 0.0% | 100% |
| 18 | 10.7% | 22.2% | 22.2% | 31.0% | 13.9% | 100% |
| 19 | 12.0% | 25.0% | 25.0% | 38.0% | 0.0% | 100% |
| 20 | 12.0% | 25.0% | 25.0% | 25.5% | 12.5% | 100% |
| 21 | 12.0% | 25.0% | 25.0% | 28.6% | 9.4% | 100% |

| Example | bubble point (psi) | Water Flow Rate (cc/cm$^2$/min/10 psi) | Wetting Time (sec.) |
|---|---|---|---|
| 17 | 65 | 19.1 | hydrophobic |
| 18 | 44 | 25.0 | hydrophobic |
| 19 | 60 | 14.1 | hydrophobic |
| 20 | 58 | 16.7 | hydrophobic |
| 21 | 60 | 15.6 | hydrophobic |

EXAMPLES 22–26

These Examples 22–26 represent membranes prepared in accord with the foregoing procedure wherein the PO-EO-PO block copolymer has been excluded. The data in Table VI supports a conclusion that the cyclic ester additive of choice herein, even in the absence of a block copolymer, will affect the hydrophilicity of the membrane. Clearly, however, use of the block copolymer further enhances the achievement of hydrophilicity, i.e., only 7.5% γ-butyrolactone is necessary to achieve an instantaneously wetting membrane with the use of the block copolymer, while without the block copolymer 11.3% of the additive was needed to achieve instantaneous wettability.

TABLE VI

| Example | PS | PEG-300 | Pluronic 10R5 | NMP | γButyrolactone | Total |
|---|---|---|---|---|---|---|
| 22 | 12.0% | 65.9% | 0.0% | 22.1% | 0.0% | 100% |
| 23 | 12.0% | 65.9% | 0.0% | 18.4% | 3.8% | 100% |
| 24 | 12.0% | 65.9% | 0.0% | 14.6% | 7.5% | 100% |
| 25 | 12.0% | 65.9% | 0.0% | 10.9% | 11.3% | 100% |
| 26 | 12.0% | 65.9% | 0.0% | 7.1% | 15.0% | 100% |

| Example | bubble point (psi) | Water Flow Rate (cc/cm$^2$/min/10 psi) | Wetting Time (sec.) |
|---|---|---|---|
| 22 | 60 | 18.1 | hydrophobic |
| 23 | 63 | 18.3 | 146 |
| 24 | 68 | 17.0 | 1.5 |
| 25 | 62 | 18.7 | instantaneous |

EXAMPLES 27–30

In Examples 27–30, the permanent nature of the hydrophilicity of the membranes prepared in accord with the subject invention was demonstrated. Three inch by eight inch (3"×8") pieces of membrane taken from the above Examples 2, 5, 7 and 15 were placed in 600 ml boiling water for twenty (20) minutes. They were then rinsed with distilled water and dried overnight. The performance of these membranes was measured again and is listed in Table VII.

TABLE VII

| Example | Membrane | bubble point (psi) | Water Flow Rate (cc/cm$^2$/min/10 psi) | Wetting Time (sec.) |
|---|---|---|---|---|
| 27 | 2 | 60 | 8.9 | instantaneous |
| 28 | 5 | 47 | 17.1 | instantaneous |
| 29 | 7 | 48 | 17.7 | instantaneous |
| 30 | 15 | 55 | 15.1 | instantaneous |

These membranes did not lose their hydrophilicity after twenty (20) minutes in boiling water.

While the foregoing examples have been added to more fully demonstrate the invention, they are not intended to be limitative with respect thereto. The full scope of the invention is found in the complete teachings of the specifications and in the claims appended hereto.

What is claimed is:

1. A process for rendering hydrophilic a separation membrane having a hydrophobic matrix polymer comprising preparing a membrane solvent system, said system comprising a hydrophobic bulk matrix polymer which absorbs less than 0.5% of its weight of water over a 24 hour period and 4% or less of its weight of water at equilibrium, and a block copolymer wetting agent having hydrophobic and hydrophilic polymer units, and doping said membrane solvent system with γ-butyrolactone additive which is compatible with the bulk matrix polymer and which is capable of positioning the hydrophilic portion of the block copolymer at the matrix-solvent interface during membrane preparation, such that the resulting membrane is substantially instantaneously wetted as compared to the wetting rate of the same membrane solvent system without the γ-butyrolactone additive.

2. The process of claim 1 wherein the hydrophobic matrix polymer is polyethersulfone.

3. The process of claim 3 wherein the γ-butyrolactone is added as at least 7.5% of the membrane solvent system.

4. The process of claim 1 wherein the block copolymer wetting agent additive includes hydrophobic units comprising alkyl group-containing units selected from the group consisting of propylene oxide and butylene oxide and hydrophilic units comprising ethylene oxide.

5. The process of claim 4 wherein the block copolymer wetting agent additive comprises repeating sequences of propylene oxide-ethylene oxide-propylene oxide block copolymer units.

6. An instantaneous wetting filtration membrane comprising a hydrophobic polymer in combination with a block copolymer wetting agent and γ-butyrolactone solvent additive, the additive being compatible with the matrix polymer and enhancing the capability of the wetting agent to render the matrix polymer hydrophilic and instantaneously wetted.

7. The filtration membrane of claim 6 wherein the hydrophobic matrix polymer is polyethersulfone.

8. The filtration membrane of claim 6 wherein the block copolymer wetting agent comprises hydrophobic units and hydrophilic units.

9. The filtration membrane of claim 6 wherein the block copolymer comprises alkyl group containing hydrophobic units selected from propylene oxide and butylene oxide and hydrophilic ethylene oxide units.

10. The filtration membrane of claim 6 wherein the block copolymer wetting agent is a propylene oxide-ethylene oxide-propylene oxide block copolymer.

11. The filtration membrane of claim 10 wherein the membrane is substantially permanently hydrophilic.

* * * * *

UNITED STATES PATENT AND TRADEMARK OFFICE
CERTIFICATE OF CORRECTION

PATENT NO. : 6,071,406
DATED : June 6, 2000
INVENTOR(S) : Dean T. Tsou

It is certified that error appears in the above-identified patent and that said Letters Patent is hereby corrected as shown below:

<u>Column 8,</u>
Line 35, please change claim 3 from
"The process of claim 3 wherein the γ-butyrolactone is added as at least 7.5% of the membrane solvent system." to
-- The process of claim 1 wherein the γ-butyrolactone is added as at least 7.5% of the membrane solvent system. --

Signed and Sealed this

Eighteenth Day of January, 2005

JON W. DUDAS
*Director of the United States Patent and Trademark Office*